(No Model.)
J. W. COE & D. MERRITT.
TWO WHEELED VEHICLE.
No. 281,457. Patented July 17, 1883.
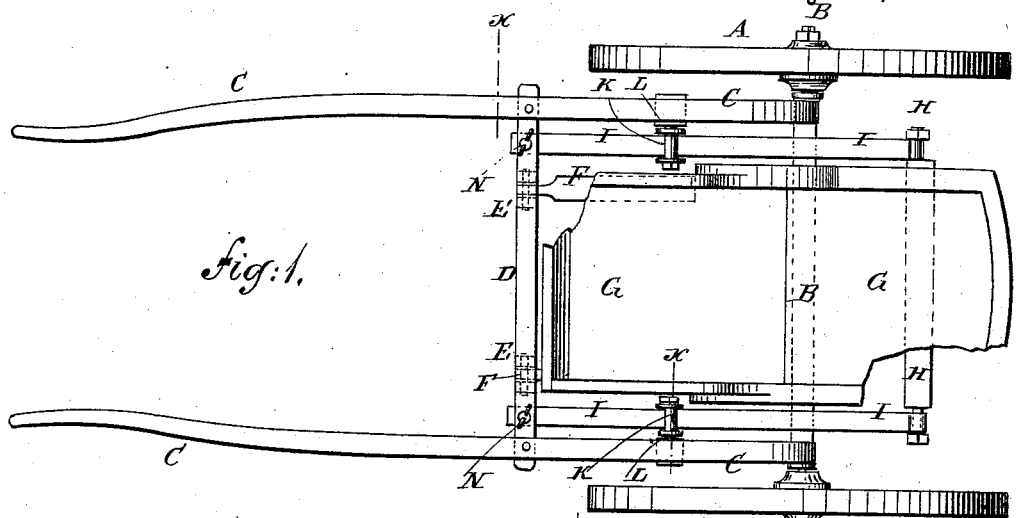
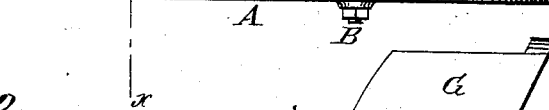
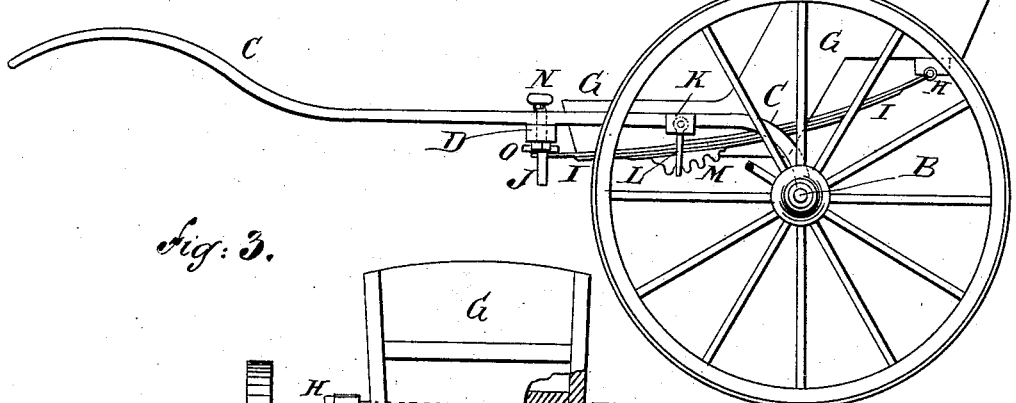
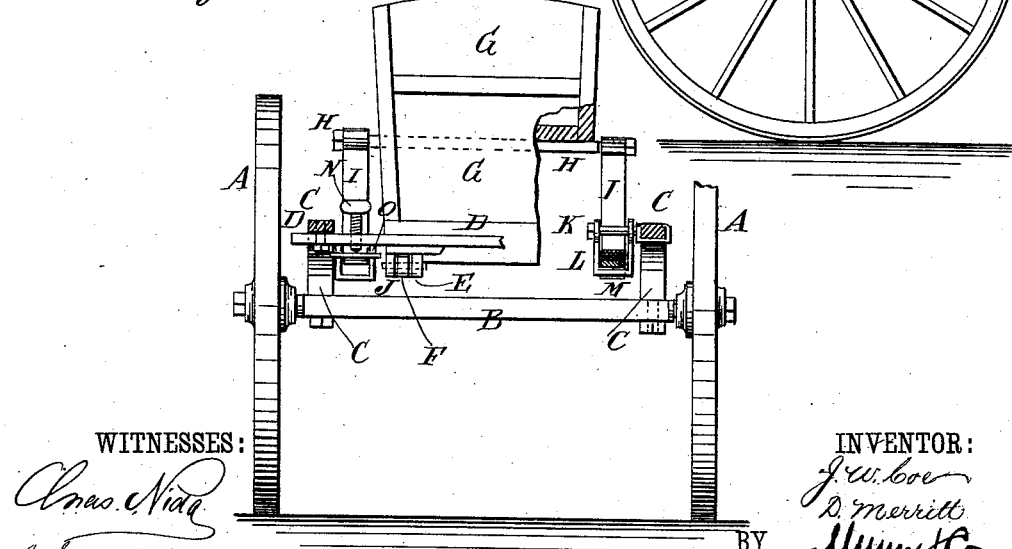
WITNESSES:
INVENTOR:
J. W. Coe
D. Merritt
BY Munn & Co
ATTORNEYS.

UNITED STATES PATENT OFFICE.

JOHN W. COE AND DANIEL MERRITT, OF BROOKLYN, NEW YORK.

TWO-WHEELED VEHICLE.

SPECIFICATION forming part of Letters Patent No. 281,457, dated July 17, 1883.

Application filed April 9, 1883. (No model.)

*To all whom it may concern:*

Be it known that we, JOHN W. COE and DANIEL MERRITT, of Brooklyn, in the county of Kings and State of New York, have invented a new and useful Improvement in Road-Carts, of which the following is a full, clear, and exact description.

Reference is to be had to the accompanying drawings, forming a part of this specification, in which similar letters of reference indicate corresponding parts in all the figures.

Figure 1 is a plan view of our improvement, parts being broken away. Fig. 2 is a side elevation of the same. Fig. 3 is a sectional front elevation of the same, taken through the broken line $x$ $x$ $x$, Fig. 1, and part being broken away.

The object of this invention is to provide road-carts so constructed that they can be readily adjusted for use by a light or heavy rider or with a small or large horse.

The invention consists in a road-cart constructed with the cart-body hinged at its forward end to the cross-bar of the shafts, and connected at its rear ends with springs resting upon adjustable swinging supports attached to the shafts in the rear of their cross-bar. The forward ends of the springs are kept in place by keepers attached to the cross-bar of the shafts, and are adjusted by set-screws connected with them and the said cross-bar, so that the cart-body will be securely held in place, and can be readily adjusted to carry a light or heavy rider, and to be used with a small or large horse, as will be hereinafter fully described.

A represents the wheels of a road-cart, to the axle B of which the shafts C are rigidly attached.

To the cross-bar D of the shafts C are attached lugs E, to which are hinged, by bolts or pins, the forward ends of the bars F, the rear parts of which are attached to the lower side of the forward part of the cart-body G.

To the lower side of the rear part of the cart-body G is attached a cross-bar, H, the ends of which project, and to them are hinged the rear ends of the springs I, the forward ends of which rest in guide-keepers J, attached to the lower side of the cross-bar D of the shafts C. To the inner sides of the shafts C are attached bolts K, or other supports, in such positions as to be a little in front of the centers of the springs I and in the rear of the cross-bar of the shaft, and to which are hinged links L, through which the springs I pass, and by which the said springs are supported.

To the lower sides of the parts of the springs I, that pass through the links L, are attached bars or blocks M, the lower sides of which may be curved, and have teeth formed in them to receive the links L, so that the points of support of the springs I may be moved forward and back as may be desired. By this construction, by moving the links L forward, the rear arms of the springs I will be lengthened, giving greater elasticity to the springs I and adapting them to support a less weight, and by moving the links L to the rearward the rear arms of the springs I will be shortened and their forward arms will be lengthened, adapting them to support a greater weight, so that the said springs can be readily adjusted to carry a light or heavy rider, as may be required. When a downward pressure is applied to the cart-body, the forward ends of the springs I will be raised into the upper parts of the keepers J, and the position of the said ends is regulated by set-screws N, which pass down through the cross-bar D, and their lower ends rest against the upper sides of the said ends of the springs I, or against wear-plates O, interposed between them and the said springs. With this construction, by operating the set-screws N, the rear part of the cart-body will be raised and lowered to adapt the position of the said cart-body to be adjusted to properly balance the cart, whether a low horse or a high horse be used.

Having thus described our invention, we claim as new and desire to secure by Letters Patent—

1. A road-cart constructed substantially as herein shown and described, and consisting of the cart-body hinged at its forward end to the cross-bar of the shafts, and connected at its rear ends with springs resting upon supports attached to the shafts, and having their forward ends kept in place by keepers attached to the cross-bar of the shafts, as set forth.

2. In a road-cart, the combination, with the forward end of the cart-body G and the cross-bar D of the shafts C, of the hinges E F, substantially as herein shown and described, whereby the said cart-body will be held securely in place, while its rear end can be readily adjusted, as set forth.

3. In a road-cart, the combination, with the shafts C, the cross-bar D, and the hinged cart-body G, of the springs I, connected with the said cart-body and cross-bar, and supported from the shafts at a point in the rear of the said cross-bar, substantially as herein shown and described.

4. In a cart-body, the combination, with the shafts C, the cross-bar D, and the hinged cart-body G, of the springs I, the swinging supports K L, and the toothed blocks M, substantially as herein shown and described, whereby the cart can be readily adjusted to carry a light or a heavy rider, as set forth.

5. In a road-cart, the combination, with the cross-bar D of the shafts and the body-supporting springs I, of the keepers J and the set-screws N, substantially as herein shown and described, whereby the cart can be readily adjusted for a small or a large horse, as set forth.

JOHN W. COE.
DANL. MERRITT.

Witnesses:
E. D. NORRIS,
JOHN GARCIA.